Feb. 26, 1957 P. DAVEY 2,782,986
BALANCE COMPUTING DEVICE
Filed Sept. 9, 1953 4 Sheets-Sheet 1

INVENTOR.
PETER DAVEY
BY
Lyman E. Dodge
ATTORNEY

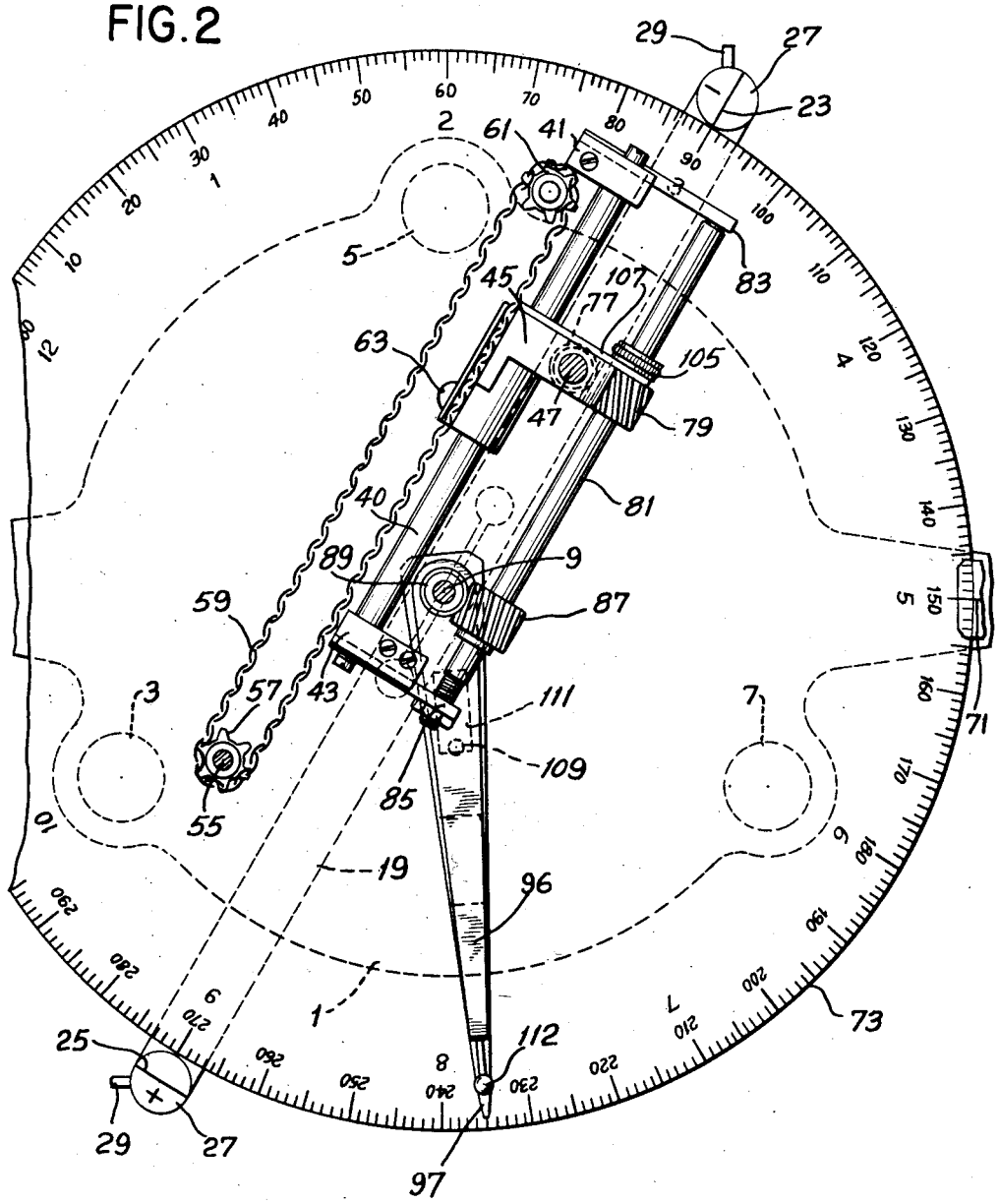

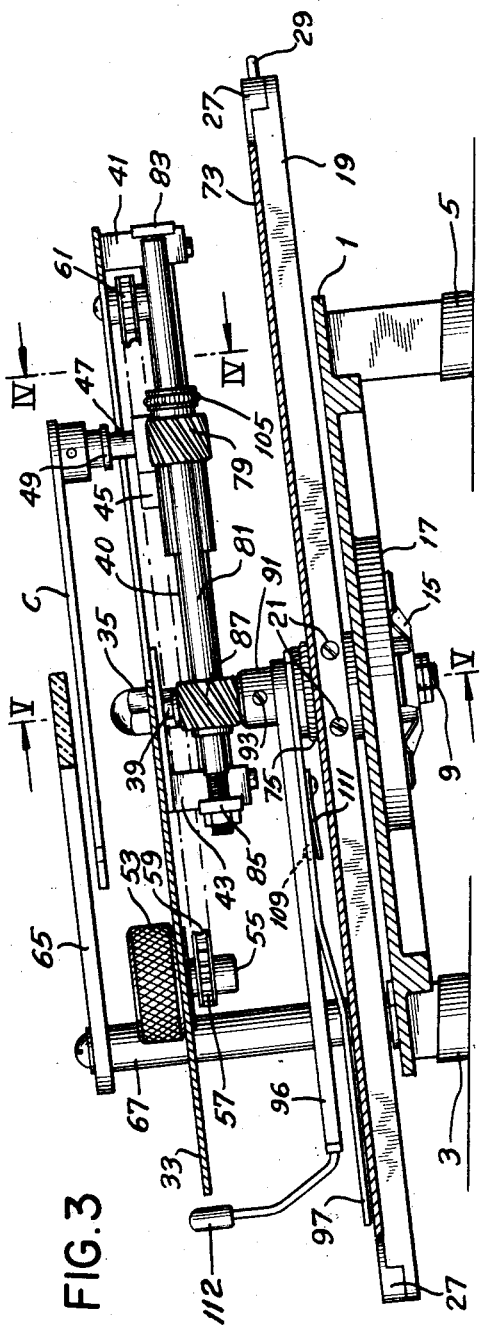

Feb. 26, 1957 P. DAVEY 2,782,986
BALANCE COMPUTING DEVICE
Filed Sept. 9, 1953 4 Sheets-Sheet 4

INVENTOR
PETER DAVEY
Lyman E. Dodge
ATTORNEY

United States Patent Office 2,782,986
Patented Feb. 26, 1957

2,782,986

BALANCE COMPUTING DEVICE

Peter Davey, White Plains, N. Y.

Application September 9, 1953, Serial No. 379,111

3 Claims. (Cl. 235—61)

This invention relates to computing, especially to vector computing and more particularly to balancing vectors computing.

A principal object of this invention is the production of a device by which the more usual vector composition and resolution problems encountered in balancing, especially dynamic balancing, of moving parts of machinery may be expeditiously solved by simple, quickly learned and quickly performed, mechanical manipulations.

Other objects and advantages will appear as the description of the particular physical embodiment selected to illustrate the invention progresses and the novel features will be particularly pointed out in the appended claims.

In describing the invention in detail and the particular physical embodiment selected to illustrate the invention, reference will be had to the accompanying drawings and the several views thereon, in which like characters of reference designate like parts throughout the several views, and in which:

Fig. 2 is a top plan view of the device as shown by Fig. 1 with some of the upper parts removed in order to more clearly illustrate the interior parts;

Fig. 3 is a fragmentary vertical cross sectional view of the device as shown by Fig. 1 on the plane indicated by the line III—III viewed in the direction of the arrows at the ends of the line;

Fig. 4 is a fragmentary vertical cross sectional view of the device as shown by Fig. 3 on the plane indicated by the line IV—IV viewed in the direction of the arrows at the ends of the line;

Figure 1:
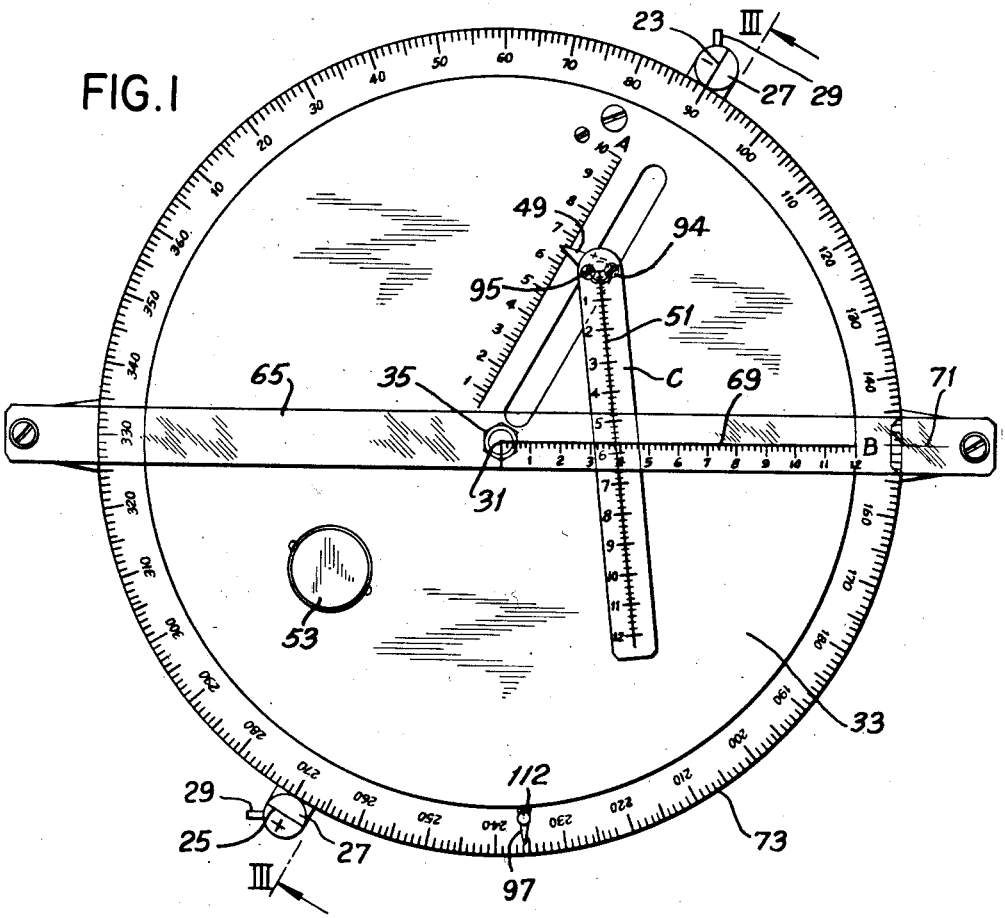
Figure 1 is a top plan view of a device embodying my invention.

Those familiar with the practice of correcting unbalance, especially correcting dynamic unbalance of moving parts of machinery, especially rotating parts, are well aware that instruments are applied to an unbalanced machine to determine the magnitude of vibration and the angular position of the point of application of the instrument, that is, the instruments are used to give the data for a vector representing the magnitude and angular direction of the measured effect of the unbalancing mass.

The amplitude of vibration of a rotating part is ascertained by the use of a device such as the well known Davey Vibrometer.

The angular position of the point of measured vibration is usually obtained by viewing equally spaced numbers or degrees marked about the circumference of a rotating part by means of a stroboscopic lamp governed by an electric circuit breaker operated by the rotation of the rotating part and opening a circuit and so flashing the lamp at a known angular position of rotation of the rotating part.

Usually, the next step in investigating the unbalance is to apply a known test weight at a known angular position and known radial position on the rotating body. This known weight is generally applied radially directly opposite the angular position of the point of greatest amplitude of vibration. After applying the known weight, instruments are again applied and a new value for amplitude of vibration and angular position of the point of a measured vibration determined. This gives another vector of which the amplitude of vibration is the magnitude and the angle is the direction. The vectors so obtained must then be subjected to a process of computation. This usually takes the form of a subtraction of the two vectors. This subtraction indicates, usually, the magnitude of the amplitude of vibration that would be caused by the test weight alone. This value may then be used to calculate the magnitude of a correction weight which will just compensate for the unbalance initially present in the machine being investigated.

Not only must the magnitude of the correcting weight be ascertained, but the angular position at which that weight must be positioned must also be determined.

The problem, hereinbefore set forth, is what might be called the main problem, although there are other problems which are very closely related thereto and of extremely frequent occurrence.

Another problem of frequent occurrence is to determine the magnitude and angular position of one correcting weight which will be equivalent to two or more temporary test weights located at chance positions around the circumference of the rotating member being investigated.

Another problem of frequent occurrence is the converse of the last mentioned problem, that is, the problem of ascertaining the position and magnitude of two or more weights to take the place of a correcting weight calculated as a certain magnitude and angular position in a case where the calculated angular position is not available for the attachment of a correcting weight.

Another problem of frequent occurrence arises when the calculations show that a weight of a certain magnitude must be positioned at a certain angular point, but a weight of that magnitude is not available, but other weights somewhat approaching it in value are available and must be used, so that it is necessary to calculate the angular position at which the available weight must be placed in order to be equivalent to the calculated magnitude and angular position.

Those familiar with dynamic balancing tasks, especially dynamic balancing which has to be performed in the field, are well aware that even simple calculations are quite difficult to perform in the field. Those familiar with the conditions know full well that the task is performed, usually in a place where there is a great clatter and whirr very likely to cause mental confusion and in proximity to rapidly moving machine parts and generally the hands of the instrument handler are quite begrimmed and there is no chair to sit on or table to rest a writing pad on. Under such conditions, calculations made with pen and paper are quite out of the question. The calculations that those who perform such balancing tasks may perform are generally only those which may be made with a piece of chalk on the floor. The difficulties surrounding the making of proper calculations during the task of attempting to balance an unbalanced machine part leads to the unfortunate practice of attempting to balance by trial and error. This almost invariably consumes an enormously greater amount of time than if the balancing were attempted with the aid of proper calculations and, furthermore, the resulting correction is seldom, if ever, as complete as that which may be easily made with the aid of proper calculation.

In order to facilitate and place the task of correcting unbalance in moving parts of machinery in the field on a firm mathematical basis especially where the task is to be performed in the presence of the unfavorable conditions hereinbefore mentioned, I have devised the apparatus hereinafter described in detail and illustrated in the drawings accompanying this specification.

In the drawings, numeral 1 designates a support or base, best shown in Fig. 3. This base has a three point support as shown in Fig. 2, at 3, 5 and 7.

Figure 5:
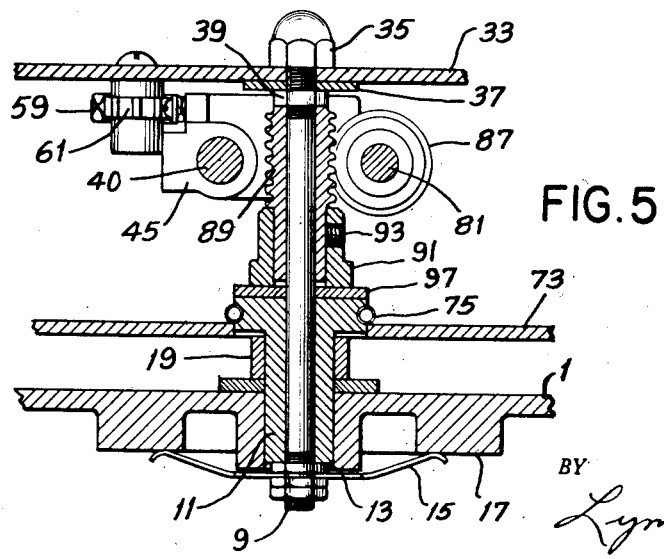
Fig. 5 is a fragmentary vertical cross sectional view of the device as shown by Fig. 3 on the plane indicated by the line V—V viewed in the direction of the arrows at the ends of the line.

As best shown in Fig. 5, support 1 rotatably supports a post 9. I prefer to position a bushing 11 in the through bore 13 formed in the base 1. This bushing cannot rotate independently of the post 9. The use of the bushing gives a broader surface for engagement with the bore 13 of the base 1. In order to hold bushing 11 and post 9 in place I prefer to use a spring 15 attached in any suitable or appropriate manner, as by nuts, to the end of the post 9 and have its legs bear upon the under side 17 of the base 1.

Extending both ways from the bushing 11 is an index arm 19, best shown in Fig. 3. This index arm is attached in any suitable or appropriate manner as by clamping screws 21 to the bushing 11 which is rotatably fixed in relation to the post 9. The index arm 19 has two indexes thereon, one at each end, 23 and 25, best shown in Fig. 1. These indexes are lines and the lines are on a small button, such as 27, which may be rotated through 90° by finger tips, as 29. The indexes may be rotated into the position as shown by index 23 so that the index line is directed to the longitudinal axis 31 of the post 9 or an index line may be moved into a position 90° therefrom as shown by 25. The indexes, when in the position as illustrated by index 23, both lie on a line which passes through the longitudinal axis 31 of the post 9. The indexes could be described as lying on radii extending from the longitudinal axis 31 and both radii lying in one straight line.

When force is applied to index arm 19, it causes a rotation of post 9 and so of face plate 33, best shown in Fig. 1, and shown in section in Fig. 5, because this face plate 33 is centrally attached to post 9 in any simple or appropriate manner as by a nut 35 on the threaded upper end of post 9 squeezing it through the intermediary of plate 37 against nut 39 threaded on the upper end of post 9.

Plate 33 supports rod 40, shown in section in Fig. 5 and in plan in Fig. 2. This rod may be supported on the under side of the face plate 33 in any suitable or appropriate manner as by means of brackets 41 and 43. This rod 40 is parallel to the line connecting and extending through the indexes 23 and 25 and the longitudinal axis of post 9.

The rod 40, as best shown in Fig. 4, supports a carriage 45. This carriage may be caused to travel along rod 40, as best shown in Fig. 2. This carriage supports a vertical shaft 47, best shown in Fig. 4. When the carriage 45 is traversed along the rod 40 the vertical shaft 47 moves in a line which is radial to the longitudinal axis 31 of the post 9 and parallel to the line passing through the longitudinal axis 31 in which the indexes 23 and 25 lie.

As best shown in Fig. 4, the shaft 47 supports and has associated with it, the pointer 49, also well shown in Fig. 1. This pointer 49 when moved bodily by reason of the movement of the shaft 47 radially of the post 9, sweeps over graduations A.

Vertical shaft 47 also supports the arm C, best shown in Fig. 1. Arm C is graduated along a line 51 on the arm C starting from the longitudinal axis of the vertical shaft 47.

The vertical shaft 47 may be moved bodily along a line radial to post 9 in any suitable or appropriate manner. I prefer to use a thumb piece 53, shown in plan in Fig. 1 and in elevation in Fig. 3. This thumb piece has a short shaft 55 attached thereto which passes down through and is journaled in face plate 33 and carries a sprocket wheel 57, best shown in Fig. 2. This sprocket engages a sprocket chain 59 which is directed at the other loop by the sprocket wheel 61. The sprocket chain 59 is attached in any suitable or convenient manner, as by screw 63, to carriage 45. The turning of thumb piece 53 causes vertical shaft 47 to move along rod 40 and causes pointer 49 to travel over graduations A.

Transverse to face plate 33 is a member 65 supported in any suitable or appropriate manner from the base 1 as by means of pillars as 67, one at each end thereof. The member 65 has a line of graduations 69 thereon, as best shown in Fig. 1. This line of graduations is radial to the longitudinal axis of post 9 and starts at that longitudinal axis.

It can be readily understood that the graduations A with the pointer 49 together with the graduations B may be used to set up two sides of a triangle and that if line 51 of the graduations on C is made to intersect the selected value of the graduations B, then the reading on C will be the magnitude of the third side of the triangle.

From the hereinbefore given description it will be readily understood that face plate 33 and index arm 19 carrying graduations A and vertical shaft 47 may be rotated about the longitudinal axis of post 9 so that the position of graduations A is only one of many positions that these graduations may assume in angular relation with member 65, so that by having means to set this angle as desired, the triangle exhibited by the radial position of shaft 47 indicated by the reading of pointer on graduations A representing one side of a triangle and another side being represented by the line of graduations B may be further set up as of a definite angle by providing means for setting a desired angle between the line of radial action of shaft 47 and the line of graduations B.

I have made provision for setting off the angle above referred to. I provide a third index 71 which is in alignment with the line of graduations 69 or B and is positioned at the bottom of a post 67 as above indicated in Fig. 2. In order to set off angles, I provide the graduated disc 73. This graduated disc is mounted on bushing 11, as best shown in Fig. 5, but is frictionally held as by the friction coil springs 75 so that graduated disc 73 will move rotatably with post 9 and index arm 19, if not restrained, but it may be moved independently of index arm 19 and post 9 and bushing 11, so that any desired graduation on disc 73 may be made to coincide with index line 23 or be made to coincide with line 25, and the index arm 19 and face plate 33 and disc 73 moving together as one, the disc 73 may be set to index 71 at any desired graduation, thereby giving in effect a desired angular distance between index 23 and 71 or between index 25 and 71.

Not only may a definite angle be set off between indexes, such as 23 and 25, and the index 71, but an angle dependent upon the rotated position of arm C and shaft 47. In order to indicate such angle, a gear, preferably a worm gear 77, best shown in Fig. 4, is attached to and rotatable with shaft 47. This worm gear, as best shown in Fig. 2, engages worm wheel 79 positioned on horizontal shaft 81. The shaft 81 is mounted for rotation in any suitable or appropriate manner as by brackets 83 and 85. Cooperating with worm 79 and shaft 81 is another worm wheel 87. Worm wheel 87 engages worm gear 89, well shown in Fig. 5. Worm gear 89 rotates freely on post 9, but is fixedly attached to holding arm hub 91, being fastened thereto in any usual or desired manner as by a blind set screw 93, best shown in Fig. 5.

A manual rotation of arm C attached in any suitable or appropriate manner as by screws 94 and 95 to shaft 47 causes the rotation of worm gear 77 and so a rotation of worm wheel 79 and shaft 81 and so a rotation of worm wheel 87 which, cooperating with worm gear 89, causes holding arm hub 91 to rotate about post 9.

When hub 91 rotates, it carries with it holding arm 96, well shown in Fig. 3, and also indicating arm 97 which is positioned to cooperate with the graduations on the circumference of the disc 73 so that a rotation of arm C about the longitudinal axis of 47 causes the indicating arm 97 together with the holding arm 96 to sweep over the graduations on the disc 73.

As shaft 47 is carried by carriage 45 it traverses rod 40 and also shaft 81, so means must be used to move the worm wheel 79 along with the carriage. In order to do this, the shaft 81, as above shown in Fig. 4, is formed with a key-way 99 in which a part of ball 101 rests. The other part of the ball 101 rests in a cavity 103 of the worm wheel 79 and is held therein by the coiled spring 105 and the several parts of the worm gear 79 are caused to move with the carriage 45 by the arm 107 on carriage 45 extending into contact therewith in a groove therein.

As at times, it is desired to move the indicating arm 97 independently of the holding arm 96, the indicating arm 97 is held to the arm 96 by a ball clutch 109 held in place by a spring 111. As arm 97 encircles post 9, when the ball clutch or click 109 is moved out of the recess in holding arm 96, the indicating arm 97 swings about post 9 and sweeps freely over the graduations on disc 73. It should also be noted that when holding arm 96 is manually held and indicating arm 97 is swung about post 9, that no motion is imparted to arm C.

As an example of the use of the device, we may take the case of the calculations required in the case of an attempt to correct for an unbalancing mass in a rotating part. Let us assume that a first reading showed that the amplitude of vibration was .0065 of an inch and that the point of maximum amplitude was at 90° from an arbitrarily selected vertical line and that after a four ounce trial correction weight at a known radial distance from the axis of rotation was applied to the rotating part at a position substantially opposite to the position of greatest amplitude of vibration, that is, at 270° in a clockwise direction from the originally arbitrarily selected vertical line that the amplitude of vibration was then .004 of an inch and the position of maximum amplitude of vibration was at 150° from the arbitrarily selected vertical line.

In order to solve the above problem, the pointer 49, by means of thumb piece 53, would be adjusted to 6.5 on the A scale. Then the minus index 23 would be turned to the position as shown in Fig. 1 and 90° on the disc 73 positioned accurately in line therewith as shown in Fig. 1. Then the complete assembly, that is, the face plate 33, the index arm 19 and the disc 73 would be rotated as a whole about the post 9 until 150° on the disc 73 coincides with the index 71, as shown in Fig. 1. Then the arm C would be swung manually until its center line graduation 51 intersects number 4, accurately, on the graduations B, as shown somewhat approximately in Fig. 1. If the intersection were precisely made in Fig. 1, the reading of scale C would be 5.7. 5.7 represents the subtraction of the first vector or reading from the second vector or reading and indicates the effect of the test weight of 4 ounces. If this test weight of 4 ounces had precisely balanced the unbalanced mass, originally or initially in the part being balanced, the reading would have been 6.5, the original vibration amplitude, but the test weight is evidently too small, so in order to make it of the proper size the 4 ounce test weight must be multiplied by the ratio between 6.5 and 5.7 and when this multiplication is made, a result of 4.56 ounces is obtained, which is the weight of the balance weight which will exactly balance the original unbalance in the machine being investigated if positioned at the same radial distance as the test weight.

Figure 6:
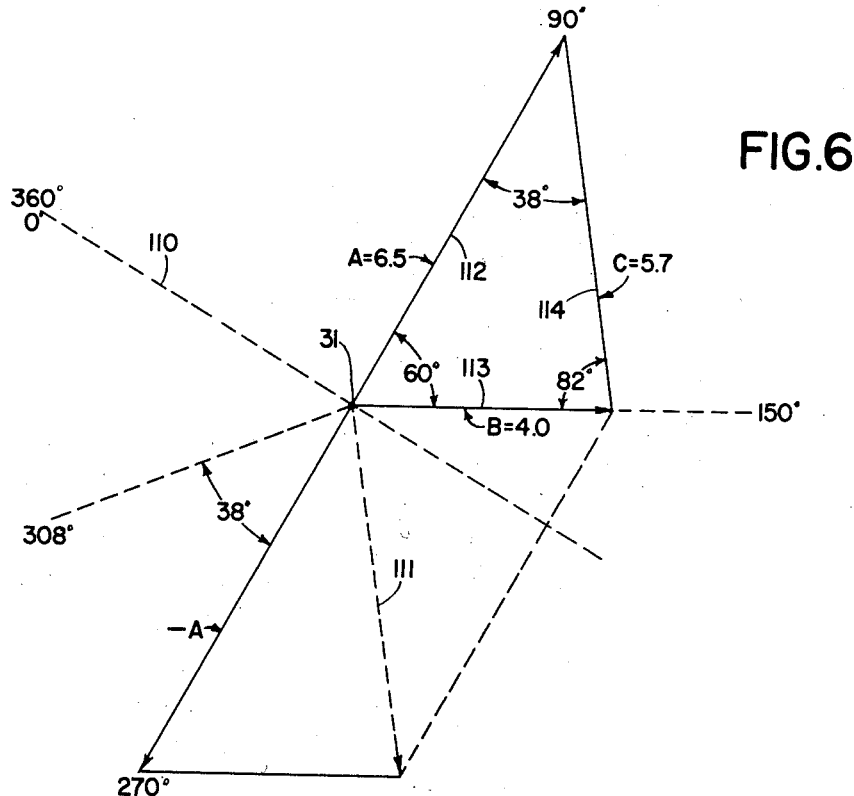
Fig. 6 is a geometrical representation of a problem which may be solved by means of applicant's apparatus.

What has been done in solving the above problem may be represented graphically by Fig. 6.

In Fig. 6, 31 may indicate the central or longitudinal axis of the post 9. The line designated 110 may be considered the arbitrarily selected vertical line mentioned in the statement of the problem. The line 112 extending from 31 to the point designated 90° may be considered a vector designated A and representing the line of action of the first mentioned vibration of .0065 of an inch and angularly displaced from the line 110 by 90°, that is, the end of vector marked 90° would represent the position of the longitudinal axis of the vertical shaft 47 when the line 113 extending from 31 toward the point marked 150° represents in magnitude and direction the force causing the vibration of .004 of an inch in the problem, that is, a second vector. The last mentioned vector can be designated B as it extends along and is set up along the graduations B.

The lines A and B in Fig. 6 represent two vectors and the problem is to find the difference between these two vectors. This is done in the usual way by extending vector A down below axis 31 and that portion of the line below point 31 in Figure 6 will be designated vector minus A. Then a parallelogram is completed on minus A and B. A vector difference is represented by line 111 which is equal in magnitude and direction to the line 114 which is, in effect, the graduations 51 on arm G. As indicated hereinbefore the vector C is equal to 5.7 expressed in units corresponding to the units in which A and B are expressed.

Trigonometric calculations will show that the triangle formed by the two given vectors and the vector derived by the subtraction of one vector from the other form a triangle of which the sides are as stated and of which one angle, that adjacent the longitudinal axis 31, is 60°, that is, the difference between 90° and 150°. Further trigonometric calculations will indicate the angle adjacent the 90° mark is equal to about 38°.

The calculations so far have not indicated the angular position of the correcting weight. In order to obtain this, with the set up as already described with the center line of graduations of arm C precisely intersecting number 4 on the B graduations, the holding arm 96 would be grasped by the manually holding portion 112 and held tightly in its then position and then indicating arm 97 would be moved over the graduations on disc 73 until it coincided with 270° which would place it in the angular position of the test weight of 4 ounces originally applied. The finger piece 111 would then be released and then arm C would be swung so that its center line graduations 51 precisely cut the longitudinal center line 31 of the post 9. This movement would move indicating arm 97 to a position indicating the angular position of the correcting weight, that is, it would move it to 308° on disc 73. If the correcting weight of 4.56 ounces is then applied to the rotating part at an angle of 308° from the arbitrarily selected line, and at a radial distance from the center of the rotating part equal to the radial distance at which the test weight four ounces was applied, the original unbalance of the machine being investigated would be corrected.

The angular position of the vector whose magnitude is 5.7 as regards the vertical line 110 is obtained by the use of the machine. What is done, in effect, is to first move line 111 of Fig. 6 by moving indicating arm 97, without moving C until line 111 coincides with line minus A of Fig. 6, then, by grasping C, line 111 is, in effect, moved through an angle of 38°, because after the indicating arm 97 was moved independently of C to a position coincident with minus A, that is, the 270° position, then when C making an angle of 38° with A was moved in line with A it moved the indicating arm 97 through 38°, that is, so that it would point to 308° thus giving the position of the correcting weight or the angle of the vector with reference to line 110.

The above example is one which involves a subtraction of vectors and so the minus end of index arm 19 is used. Of course it is possible to do away with the minus index 23 and make the setting from the plus index 25, but for a subtraction of vectors it will be necessary to add 180° to the original angle, that is, the angle of 90° from the arbitrarily selected vertical line. This, in the instant case, would mean that the index 25 would be set at 270° on the disc 73.

A problem involving addition and so use of index 25 would be typified by one in which there is given a weight, say 4 ounces at 330° and another weight, say 7½ ounces at 255° and it is desired to know the magnitude and position of a single equivalent weight. First the 4 ounce magnitude would be set up on the A graduation and the disc 73 turned until 330° registers with the plus index 25 turned to a right angle from its position as shown in Fig. 1. Next the complete assembly, that is, the index arm 19, the face plate 33, and the disc 73 would be rotated as a whole until 255° on disc 73 registered with index 71. Then the arm C would be rotated along with shaft 47 so that the center line of the graduations 51 would intersect scale B at 7.5, the magnitude of the second weight. The reading on arm C where the center line of graduations on arm C intersects the center line of graduation B at 7.5 would give a reading of 9.35 and the indicating arm 97 together with holding arm 95 coinciding therewith having been moved by the rotation of arm C about shaft 47, would point to 279° on disc 73, so that a weight of 9.35 ounces at 279° would be equivalent to the two weights at the position originally given.

Figure 7:
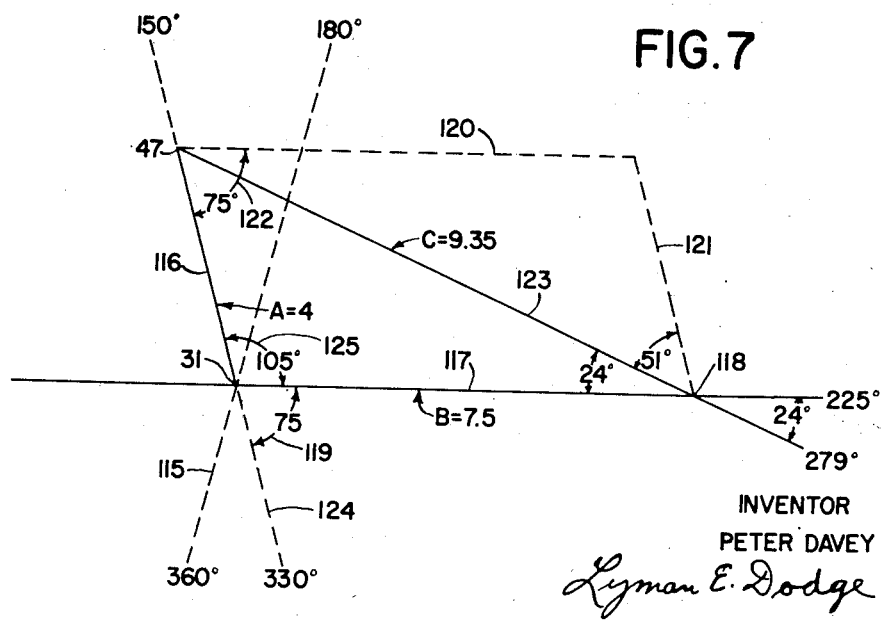
Fig. 7 is another geometrical representation of a problem which may be solved by applicant's apparatus.

The problem involving the addition of two vectors may be indicated geometrically by Fig. 7.

In Fig. 7, line 115 may represent the assumed vertical line as mentioned in the problem and 31 may represent the central or longitudinal axis of the post 9. Line 116 represents radial line from 31 to the longitudinal center line of post 47. This line is an extension of the radial line extending from 330° on the circle about center 31. This magnitude is equal to the 4 ozs. in the stated problem. The line 117 is the line corresponding to line 69 of Fig. 1, when the circle 73 indicates 255° at line 71 and the line from 47 to 31 extended coincides with 330°, that is, when the index line 25 is in coincidence with 330°.

The line 117 is of a magnitude of 7.5 as given in the problem and the point 118 coincides with the graduation 7.5 on the scale of B.

If a parallelogram is constructed on the lines 116 and 117, line 120 will be parallel and equal to 117 and line 121 will be parallel and equal to line 116, then the line 123 will be the resultant of addition of the vectors A and B and its length will be 9.35. Line 123 representing the position of the arm designated C in Fig. 1 would represent the value that is sought by the problem. This will be understood if it is observed that the angle 122 between lines 116 and 120 is equal to the angle 119 so that the parallelogram of vectors constructed is identical with a parallelogram of vectors constructed on the lines 117 and 124 if line 124 is equal in magnitude to line 116 and the line 123 would be equal and parallel to the diagonal of that parallelogram.

The angular position of line 123 as regards line 115 would be indicated by the pointer 97 which indicates the angular position of C and this would point to 279°. That it should so point can be proved by solving the triangle made up of the lines 116, 117 and 123 if cognizance of the fact is taken that angle 124 is 105°, that is, the supplement of the 75° angle, 119. The net result would be a magnitude of 9.35 positioned at the same radial distance as the two weights of 4 ozs. and 7½ ozs. and at the 279° angle when the assumed vertical line is at the 360° angle.

The explanation of the method of solving the above two problems is not an explanation of all of the possible uses of the device, but it illustrates it so that one understanding these two problems may successfully use the device for solving the other problems which arise in the course of dynamic balancing.

Although the disc 73 is shown as graduated into 360° it is also shown with numerals 1 to 12 inclusive. These numerals from 1 to 12 inclusive represent the usual numerals generally placed by dynamic balancing experts around the circumference of a rotating part being balanced and are used quite frequently in place of the actual degrees, but are understood to have a definite relation to the degrees, that is, 12 is supposed to be situated at the 360° point and 6 at the 180° point and 3 at the 90° point and 9 at the 270° point and the other numbers, as is evident, at 30° from these cardinal points. In the actual task of correcting an unbalance in the machine, the intermediate values between the several numbers are often estimated by the eye. This may be done sufficiently accurately for practical purposes in very many cases.

Although I have particularly described one particular physical embodiment of my invention and explained the construction and principle thereof, nevertheless, I desire to have it understood that the form selected is merely illustrative, but does not exhaust the possible physical embodiments of the idea of means underlying my invention.

What I claim as new and desire to secure by Letters Patent is:

1. A balance weight computer, including, in combination, a support, a post supported rotatably by the support, an index arm extending from the post and attached thereto to rotate therewith and formed with an index, a face plate attached to the post to rotate therewith, a rod parallel to a radial line from the longitudinal center line of the post to the index on the index arm supported by the face plate, a pointer, a vertical shaft supporting the pointer, the vertical shaft supported by the rod and movable therealong in a line radial to the post and parallel to the rod, means for moving the vertical shaft and pointer along the rod, graduations on the face plate over which the pointer sweeps, an arm carried by the vertical shaft, the arm formed with a line of graduations thereon extending radially from the longitudinal center line of the vertical shaft, a member extending transversely of the face plate and formed with a line of graduations radially of the post beginning in the extended longitudinal center line of the post, a disc mounted on the post, means frictionally engaging said disc with the post so that the disc may rotate when the post is rotated and the disc may rotate independently of the post, the disc being graduated along its periphery and positioned to cooperate with the index, a second index in line with the line of graduations on the member, the second mentioned index positioned to cooperate with the graduations on the disc, a gear positioned on the post to rotate thereon, a manually operable holding arm attached to the gear for preventing rotation thereof, a second gear attached on the vertical shaft, means connecting the first and second gears whereby one drives the other, an indicating arm rotatably mounted on the post and extending along the holding arm to a position where it cooperates with the graduations on the disc, means detachably connecting the indicating arm to the holding arm.

2. A balance weight computer, including, in combination, a support, a post supported rotatably by the support, an index arm extending in opposite directions from the post and attached thereto to rotate therewith and formed with indexes, one at each end thereof both in a line extending through the longitudinal center line of the post, a face plate attached to the post to rotate therewith, a rod parallel to a radial line from the longitudinal center line of the post to an index on the index arm supported by the face plate, a pointer, a vertical shaft supporting the pointer, the vertical shaft supported by the rod and movable therealong in a line radial to the post and parallel to the rod, means for moving the vertical shaft and pointer along the rod, graduations on the face plate over which the pointer sweeps, an arm carried by the vertical shaft, the arm formed with a line of graduations thereon extending radially from the longitudinal center line of the vertical shaft, a member extending transversely of the face plate and formed with a line of graduations radially of the post beginning in the extended longitudinal center line of the post, a disc mounted on the post, means frictionally engaging said disc with the post so that the disc may rotate when the post is rotated and the disc may rotate independently of the post, the disc being graduated along its periphery and positioned to cooperate with the indexes, a third index in line with the center line of the graduations on the member, the third mentioned index positioned to cooperate with the graduations on the disc, a gear positioned on the post to rotate thereon, a manually operable holding arm attached to the gear for preventing rotation thereof, a second gear attached on the vertical shaft, means connecting the first and second gears whereby one drives the other, an indicating arm rotatably mounted on the post and extending along the holding arm to a position where it cooperates with the graduations on the disc, means detachably connecting the indicating arm to the holding arm.

3. A balance weight computer, including, in combination, an axis, a rotatable member having a longitudinal axis parallel to the first mentioned axis, means revolvable about the first mentioned axis supporting the rotatable member, means for bodily moving the member radially toward and away from the first mentioned axis, a pointer supported by the rotatable member, graduations on the first mentioned means over which the pointer sweeps radially to the first mentioned axis, second graduations fixed along a line extending radially from the first mentioned axis, an arm attached to the rotatable member, third graduations on the arm along a line extending radially from the longitudinal axis of the rotatable member whereby when the length of one side of a triangle is set up on the first mentioned graduations, and the length of another side of the triangle on the second graduations is intersected by the line of third graduations the length of the third side of the triangle is exhibited by the third graduations, and means for positioning the line of movement of the rotatable member relative to the line of the second graduations at the included angle of the first two mentioned sides of the triangle, and means positioned by the arm exhibiting the angle of the third mentioned side of the triangle relative to the first mentioned side of the triangle.

References Cited in the file of this patent

UNITED STATES PATENTS

| | | |
|---|---|---|
| 1,419,283 | Mattson | June 13, 1922 |
| 1,560,747 | Weinbach | Nov. 10, 1925 |
| 1,784,929 | Estoppey | Dec. 16, 1930 |
| 2,424,877 | Crawford | July 29, 1947 |
| 2,547,955 | Marsh | Apr. 10, 1951 |
| 2,689,083 | Hammond, Jr. | Sept. 14, 1954 |